(12) United States Patent
Loccisano

(10) Patent No.: US 12,247,546 B1
(45) Date of Patent: Mar. 11, 2025

(54) UNIDIRECTIONAL HYBRID YAW

(71) Applicant: Vincent Loccisano, Wellesley, MA (US)

(72) Inventor: Vincent Loccisano, Wellesley, MA (US)

(*) Notice: Subject to any disclaimer, the term of this patent is extended or adjusted under 35 U.S.C. 154(b) by 0 days.

(21) Appl. No.: 18/621,698

(22) Filed: Mar. 29, 2024

Related U.S. Application Data

(60) Provisional application No. 63/492,838, filed on Mar. 29, 2023.

(51) Int. Cl.
| | |
|---|---|
| *F03D 15/00* | (2016.01) |
| *F03D 1/06* | (2006.01) |
| *F03D 9/25* | (2016.01) |
| *H02K 7/18* | (2006.01) |

(52) U.S. Cl.
CPC ........... *F03D 15/00* (2016.05); *F03D 1/0606* (2023.08); *F03D 9/25* (2016.05); *H02K 7/1838* (2013.01)

(58) Field of Classification Search
CPC ...... F03D 15/00; F03D 1/0606; H02K 7/1838
See application file for complete search history.

(56) References Cited

U.S. PATENT DOCUMENTS

| | | | | |
|---|---|---|---|---|
| 4,156,579 A | * | 5/1979 | Weisbrich | F03D 1/04 415/2.1 |
| 5,520,505 A | * | 5/1996 | Weisbrich | F03D 13/20 415/60 |
| 6,887,031 B1 | * | 5/2005 | Tocher | F03D 1/04 290/55 |
| 7,220,096 B2 | * | 5/2007 | Tocher | F03D 1/02 290/55 |
| 8,299,640 B2 | * | 10/2012 | Pare | F03D 17/00 290/44 |
| 8,653,684 B2 | * | 2/2014 | Baker | F03D 1/04 290/44 |
| 8,668,433 B2 | * | 3/2014 | Friesth | F03D 13/20 415/58.7 |
| 8,698,331 B2 | * | 4/2014 | Carter | F03B 13/22 290/43 |
| 8,931,235 B2 | * | 1/2015 | Baker | F03D 1/02 52/651.01 |
| 9,127,646 B2 | * | 9/2015 | Cory | F03D 15/00 |
| 9,328,715 B2 | * | 5/2016 | Pare | F03D 17/00 |
| 11,384,730 B2 | * | 7/2022 | Dalsgaard | F03D 9/25 |
| 11,649,805 B2 | * | 5/2023 | Par | F03D 1/04 290/44 |
| 2009/0008939 A1 | * | 1/2009 | Pare | F03D 1/04 416/61 |
| 2010/0266414 A1 | * | 10/2010 | Miller | F03D 1/0658 416/223 R |
| 2012/0175882 A1 | * | 7/2012 | Sterling | F03D 1/04 290/55 |

(Continued)

*Primary Examiner* — Tulsidas C Patel
*Assistant Examiner* — Thomas K Quigley

(57) ABSTRACT

A fluid-turbine system has a yaw method that employs a unidirectional, functional passive-yaw system in combination with controlling-active and supporting-active yaw systems. The combination active and passive yaw system has a yaw pivot point that is laterally offset from the turbine's central axis. The system yaws the turbine into the fluid-flow direction and to an orientation perpendicular to the fluid stream, protecting the turbine in the event of excessive winds, loss of connection to grid power, or other system-protection modes.

3 Claims, 8 Drawing Sheets

(56) References Cited

U.S. PATENT DOCUMENTS

| | | | |
|---|---|---|---|
| 2013/0058792 A1* | 3/2013 | Pare | F03D 13/20 |
| | | | 416/244 R |
| 2015/0115607 A1* | 4/2015 | Stepanov | F03D 7/06 |
| | | | 415/13 |
| 2021/0146307 A1* | 5/2021 | Dehlsen | C02F 1/441 |
| 2022/0307468 A1* | 9/2022 | Gollnick | F03D 7/0204 |
| 2023/0032161 A1* | 2/2023 | Glavind | F03D 17/00 |

\* cited by examiner

200

UNIDIRECTIONAL HYBRID YAW

TECHNICAL FIELD

The present disclosure relates to fluid turbines and specifically to a shrouded fluid turbine with a hybrid yaw system.

BACKGROUND

Conventional horizontal-axis fluid turbines (HAWTs) have two to five open blades arranged like a propeller, with the blades mounted to a horizontal shaft attached to a gear box which drives a power generator. Gearbox and generator equipment are housed in a nacelle.

The present embodiment relates to the field of fluid turbines, and more particularly to a method and apparatus for protecting a turbine in extreme conditions. Some embodiments have a shrouded turbine, which is a ringed airfoil that surrounds a rotor is in fluid communication with ejector elements.

In the field of fluid energy conversion, turbines are typically mounted on vertical support structures at the turbine's approximate center of gravity and near the center of pressure. The center of pressure is the point on the turbine where the total sum of the pressure field causes a force and no moment force about that point. A turbine's center of pressure is typically near the downwind portion of the rotor plane, aligned with the axis of symmetry. The point at which the support structure engages the turbine is often behind the rotor plane at the nacelle.

Aerodynamic structures are employed to passively yaw the turbine. Large turbines generally employ mechanical yaw systems that are engaged with a support structure on a pivot axis that is near the center of gravity and near the center of pressure. One skilled in the art understands that pivot-axis location vs. center of pressure can result in thrust forces that require active yaw components to continuously correct yaw.

Yaw systems rotate a wind turbine's nacelle into the direction of the wind. An active-yaw system (or motor-driven yaw system) is usually located between a tower top and a nacelle, with its components situated in the nacelle as well as in the tower. A yaw system of this kind has at least one adjustment drive, which may be equipped with a gearbox and a yaw bearing engaged with a ring gear. Once a nacelle's yaw is adjusted, it is immobilized by brake units, which generate the necessary holding torque.

The aerodynamic principles of a shrouded turbine apply to any fluid, whether liquid, gas or combination thereof.

"Rotor" refers to any assembly in which one or more blades are attached to a shaft and rotate, allowing for the extraction of power or energy from wind rotating the blades. Any propeller-like rotor or a rotor/stator assembly may be enclosed in the turbine shroud in the present disclosure.

In this disclosure a "ringed airfoil" is alternatively referred to as a turbine shroud.

BRIEF DESCRIPTION

A fluid-turbine system has a yaw method that employs a unidirectional, functional passive-yaw system in combination with controlling-active and supporting-active yaw systems, referred to as a hybrid-yaw system.

In an example embodiment, a fluid turbine comprises a rotor in combination with an annular airfoil. ("Airfoil" is alternately referred to as "turbine shroud.") The shrouded turbine energizes the wake behind a rotor plane. In one embodiment the annular airfoil comprises an annular leading-edge form that is in fluid communication with the circumference of a rotor plane. The annular leading edge transitions to a trailing edge. In some embodiments, a second annular airfoil, referred to as an ejector shroud, is in fluid communication with the trailing edge of the first shroud and is coaxial with the first shroud. Together, the two shrouds reduce pressure behind the rotor plane and increase fluid velocity near the inlet of the first ringed airfoil (at the cross-sectional area of the rotor plane). The effects of the mixing elements and the energized wake provide a rapidly mixed, shorter wake compared with the wake of horizontal-axis wind turbines with open rotors.

Shrouded and ducted fluid turbines increase efficiency in generating electrical energy from fluid currents but also require increased surface areas, which increase loading on the turbine's structural components. Engagement between the turbine and the support structure at a point that is offset along the lateral axis from the center of gravity, as well as offset from the center of pressure along the anteroposterior axis, provides a passive-yaw means that is unidirectional.

The turbine and shrouds are a platform for a combination unidirectional-passive-yaw and active-yaw system. Active yawing is enabled through a variety of mechanisms and drive arrangements, as understood by one skilled in the art. One such mechanism is a geared drive unit(s) engaged with a slew ring between a bearing race between the tower and turbine. This geared drive unit may be electrically, hydraulically or electromechanically actuated. Various methods could be employed to enable passive yaw. One is by a clutch that that is mechanically disengaged in high-wind situations. Unidirectional, passive yaw relies on an asymmetrical orientation of a yaw pivot point. Passive yawing may occur by simply overriding an integral "slip clutch."

In the operating position of a turbine, the central axis is generally aligned with the direction of the fluid stream. Since the support structure is not at the center of gravity or center of pressure, this orientation causes greater fluid-stream forces on one side of the turbine's anterior. Fluid-stream forces tend to cause rotation of the turbine toward the side experiencing greater applied forces. This is known as unidirectional-passive yaw. An active yaw system with a brake or clutch rotates the turbine in the opposite direction of the passive-yaw rotation, or holds the turbine in a given orientation. Releasing the brake causes the turbine passively yaw, i.e., to yaw toward the side experiencing greater fluid forces. An active-yaw system rotates the turbine in the opposite direction of the unidirectional-passive yaw. In the event of active-yaw system failure, the unidirectional-passive yaw system will direct the turbine to an orientation in which the central axis is perpendicular to the fluid stream. Such an orientation protects the rotor and other components from damage in excessive fluid streams.

In an embodiment, shrouds are designed for minimum side-loading so as to reduce drag in this orientation. In the context of this invention, the aforementioned yaw techniques are considered a hybrid-yaw system.

The turbine has a support structure that is offset from the center of gravity and from the center of pressure. This provides a unidirectional passive-yaw means that, in the event of excessive winds, loss of connection to grid power or other system-protection modes, orients the turbine perpendicular to a fluid stream.

A shrouded turbine has a means of engaging with a support structure that is offset along the lateral axis from the turbine's center of gravity while pivoting on the support structure about an axis that is offset along the anteroposterior axis from the turbine's center of pressure. Such a configuration provides a means of passively yawing the turbine in one radial direction.

DETAILED DESCRIPTION

A fluid turbine with paired ringed airfoils provides an improved means of extracting energy from fluid currents. ("Fluid" in this disclosure may be gas or liquid). In one embodiment, a fluid turbine has a ringed airfoil that surrounds a rotor, and a second airfoil surrounding the exit of the first ringed airfoil. The first ringed airfoil has a rotor that extracts power from a primary fluid stream. The second ringed airfoil is an ejector airfoil with mixing elements and ejector elements that may include an ejector pump. The ringed airfoil, turbine shroud and ejector elements enable increased energy extraction resulting from higher flow rates through the rotor. Paired shrouds transfer energy from the bypass flow to the rotor-wake flow, enabling a higher-energy per unit-mass-flow-rate through the rotor. These two effects enhance the turbine system's power production.

The turbine employs a hybrid yaw system that is a combined, integrated functional-passive yaw system and controlling and supporting active-yaw system.

The leading edge of a turbine shroud may be considered the leading edge or front or inlet end, and the trailing edge of an ejector shroud may be considered the rear of the fluid turbine. A first component of the fluid turbine, located closer to the front of the turbine, may be considered "upstream" of a second, "downstream" component closer to the rear of the turbine.

Figure 1:
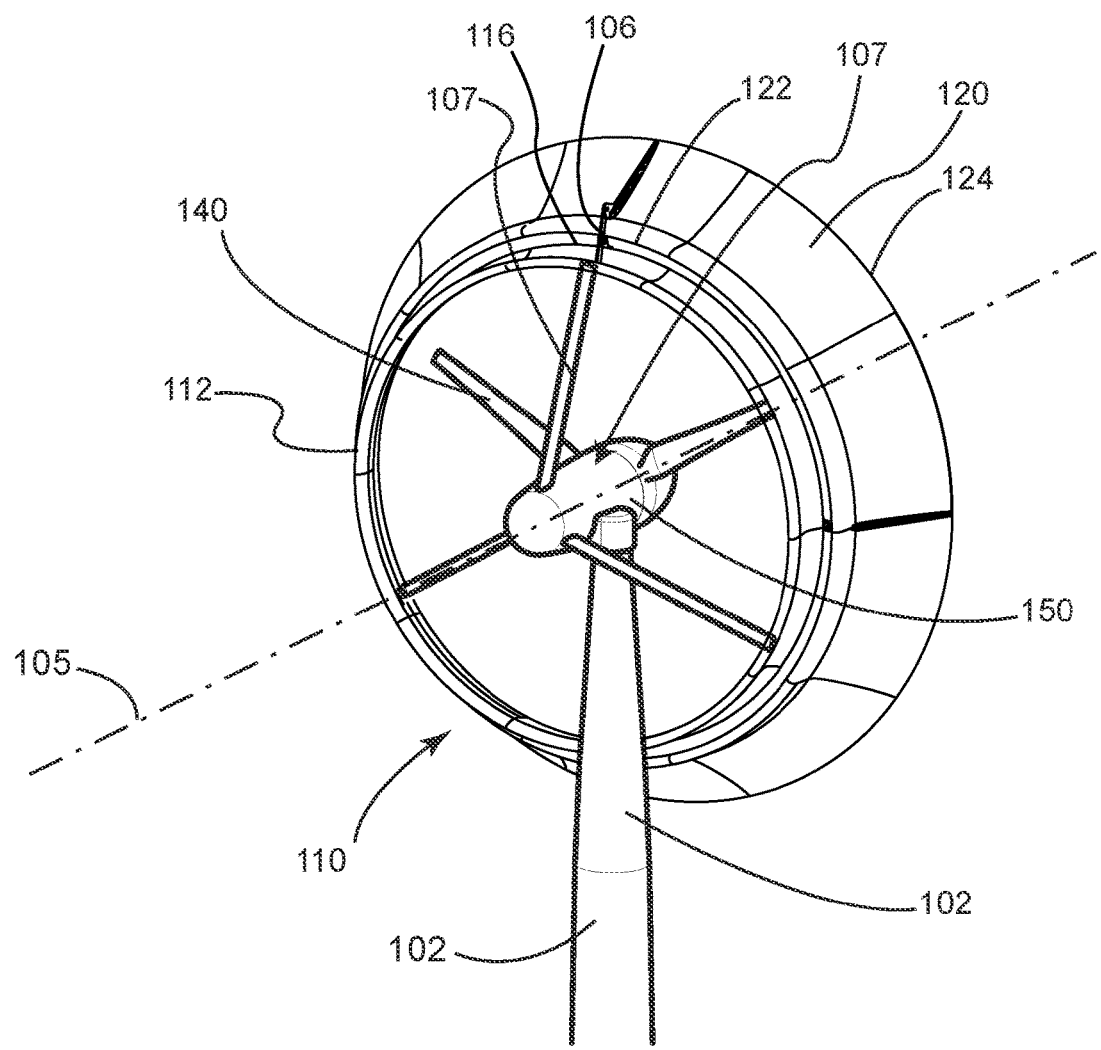
FIG. 1 is a front, right, perspective view of an example embodiment of the present disclosure.
Figure 2:
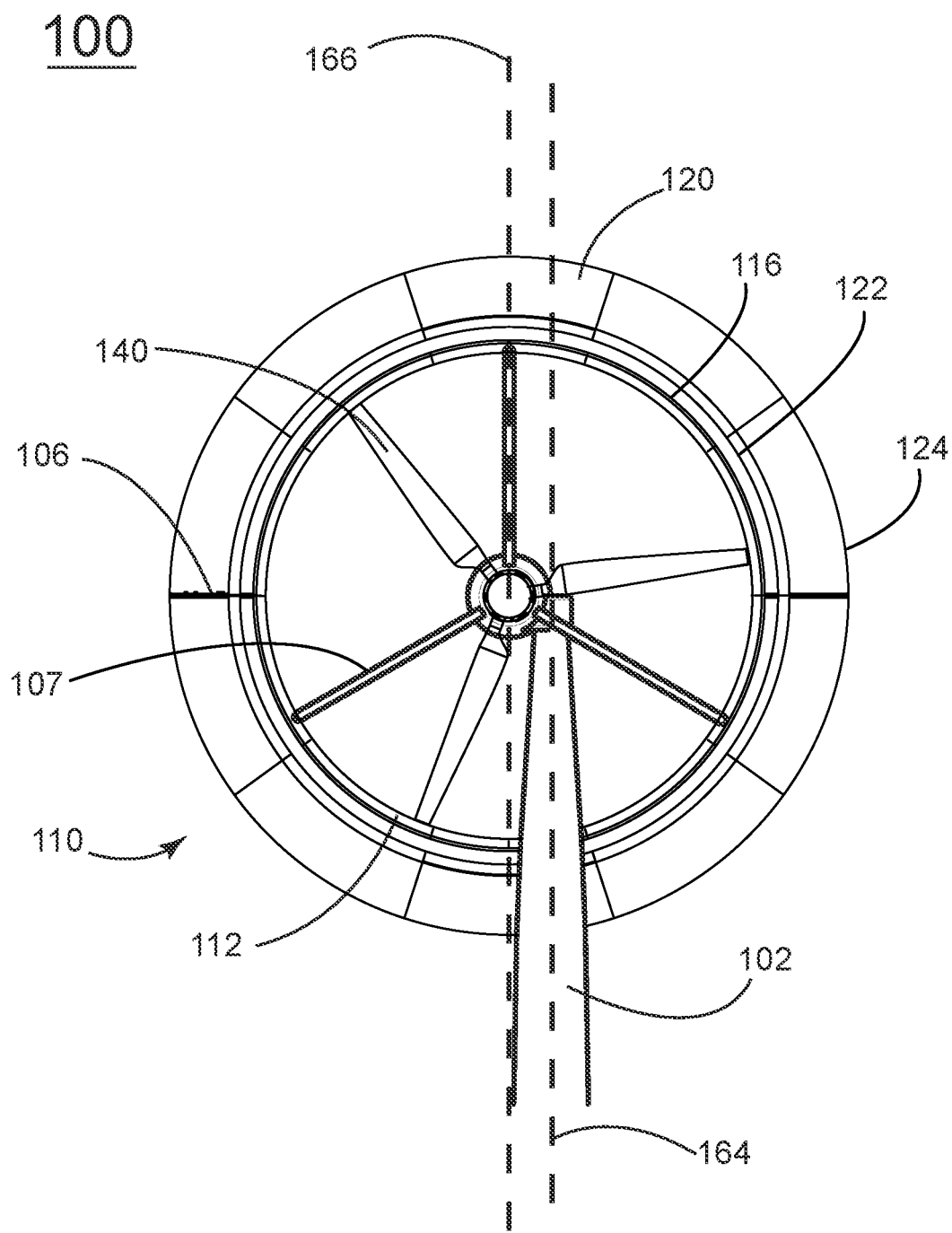
FIG. 2 is a front view of the embodiment of FIG. 1.
Figure 3:
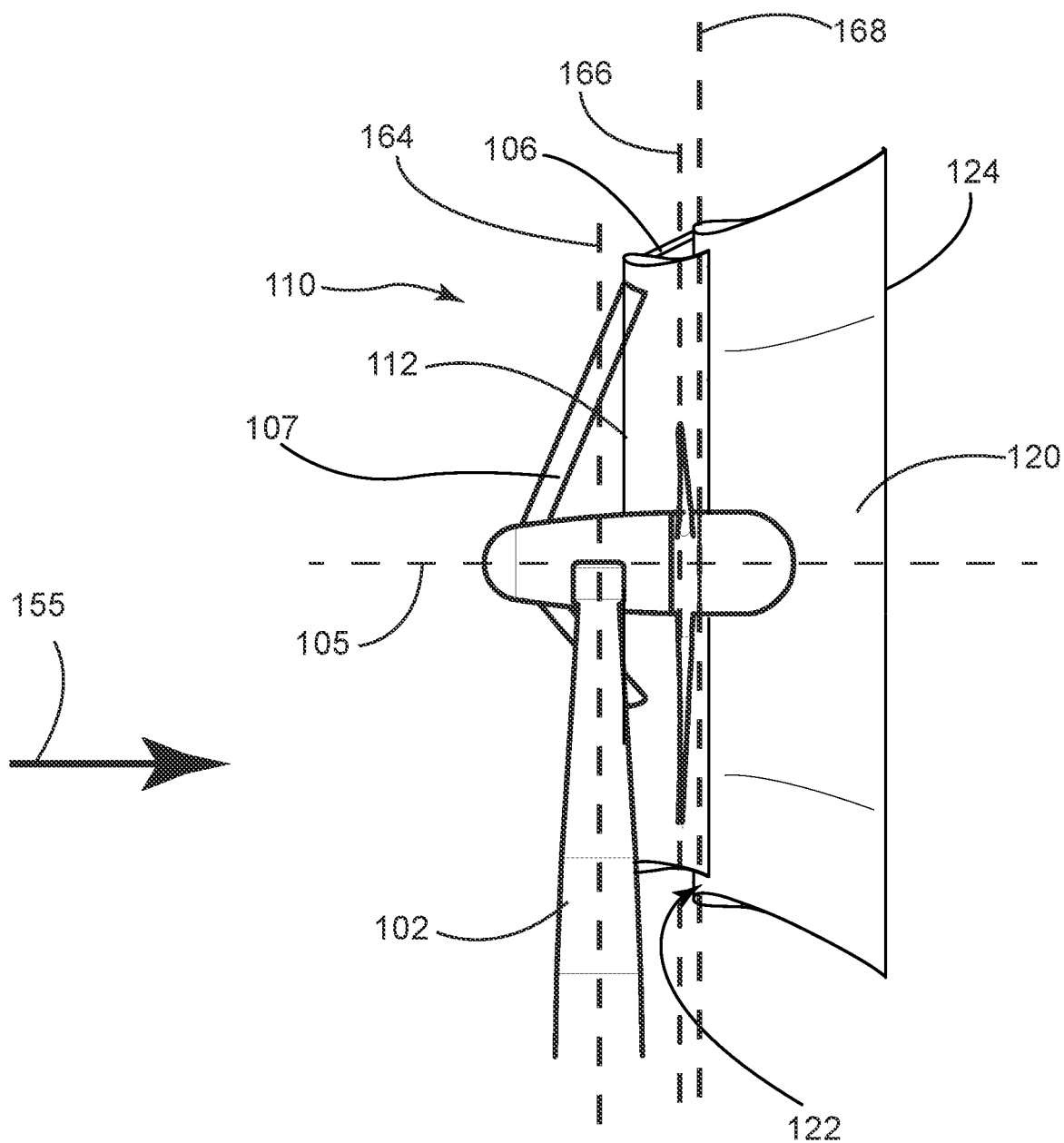
FIG. 3 is a side, orthographic, section view of the embodiment of FIG. 1.

FIG. 1, FIG. 2 and FIG. 3 show a fluid turbine 100 with A nacelle body 150, a rotor 140, and ringed airfoils 110, the second airfoil with mixing elements and ejector elements. The ringed airfoil 110 includes an inlet end 112 and an exhaust end (also referred to as a trailing edge) 116. Support structures 107 are engaged at the proximal end with the nacelle 150, and at the distal end with the ringed airfoil 110. An ejector or an assembly of similar elements that comprise a ringed airfoil ejector 120 is in fluid communication with the trailing edge 116 of the turbine shroud 110 and is supported by structures 106. The rotor and hub 140, nacelle 150, turbine shroud 110, and ejector 120 are concentric about a common horizontal axis 105 and are supported by a tower structure 102. Free-flow fluid stream is represented by arrow 155 (FIG. 3).

A vertical axis 164 denotes the turbine center of vertical rotation, otherwise known as the yaw axis. Another vertical axis 166, denoting the center of the rotor plane, is perpendicular to the horizontal axis 105 and is referred to as the central vertical axis. A vertical line 168 denotes the center of pressure and is located downstream of the rotor plane. The turbine is generally symmetrical on a vertical axis 166 and pivots about the yaw axis 164. The yaw axis 164 unevenly bisects the turbine to one side of the central axis 166. Due to this offset and to the free-flow fluid stream 155, which exerts a generally even force across the front surface of the turbine, there is a greater rotational force toward the side of the turbine that the yaw axis 164 is offset away from. Of the two uneven segments bisected by the yaw axis 164, the larger segment will cause a greater yaw force than the smaller segment when the turbine is facing the oncoming fluid stream 155. This is referred to as asymmetrical passive yaw or unidirectional passive yaw. In the event of failures such as yaw-motor power loss or yaw-mechanism brake failure, the unidirectional-passive yaw will orient the turbine such that the horizontal axis 105 is perpendicular to the fluid stream 155.

Figure 4:
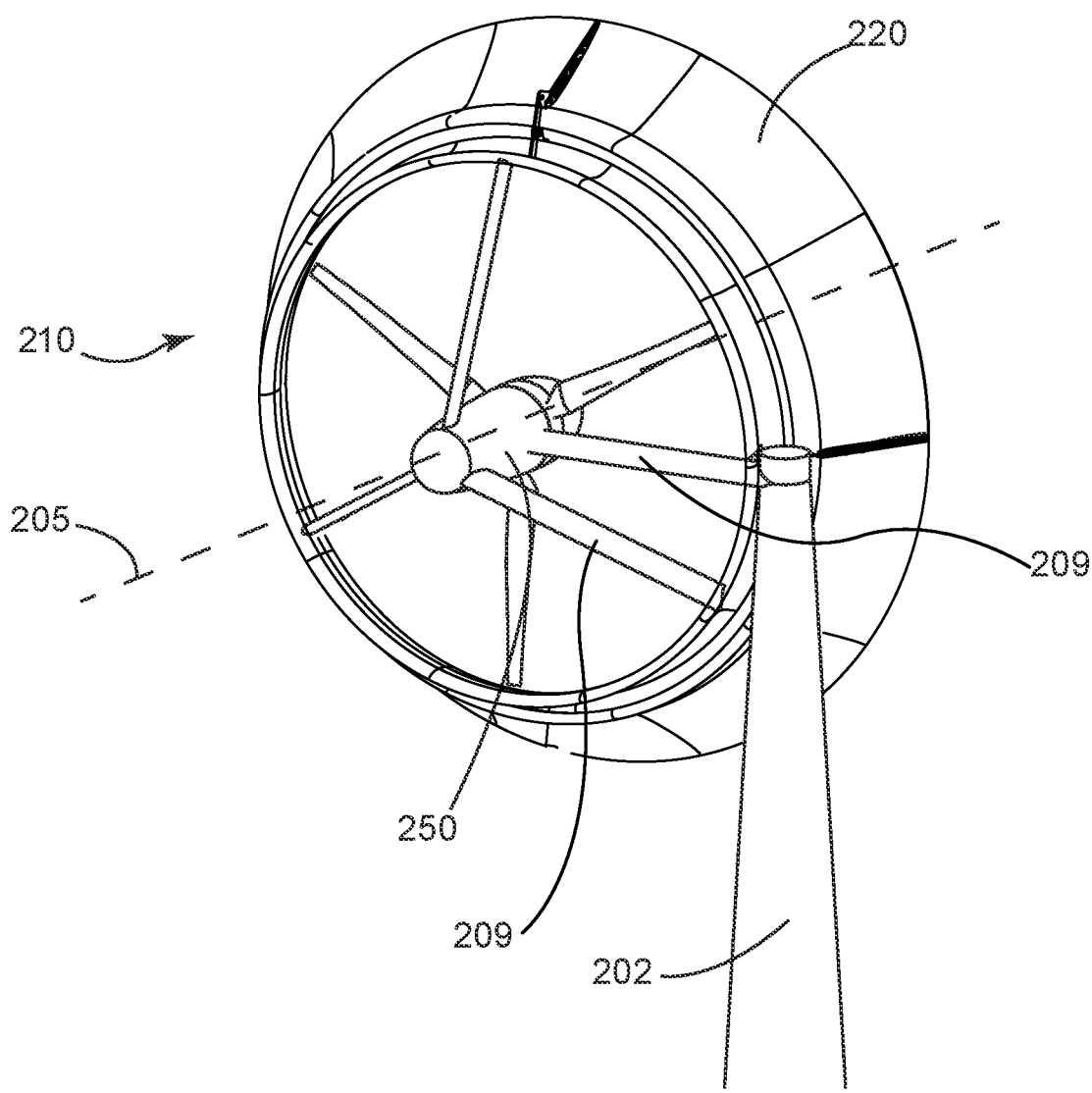
FIG. 4 is a front, right, perspective view of an example embodiment of the present disclosure.
Figure 5:
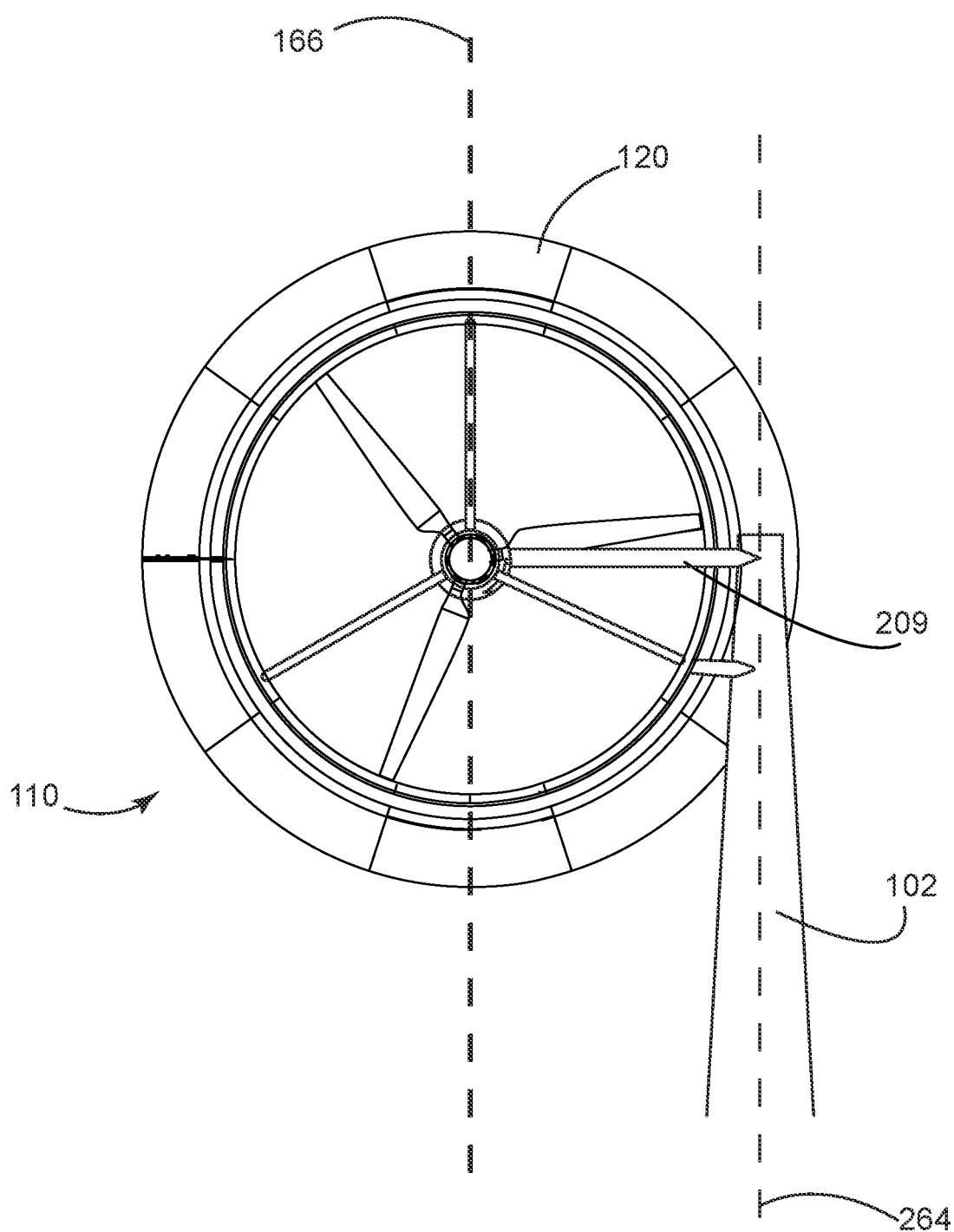
FIG. 5 is a front view of the embodiment of FIG. 4.
Figure 6:
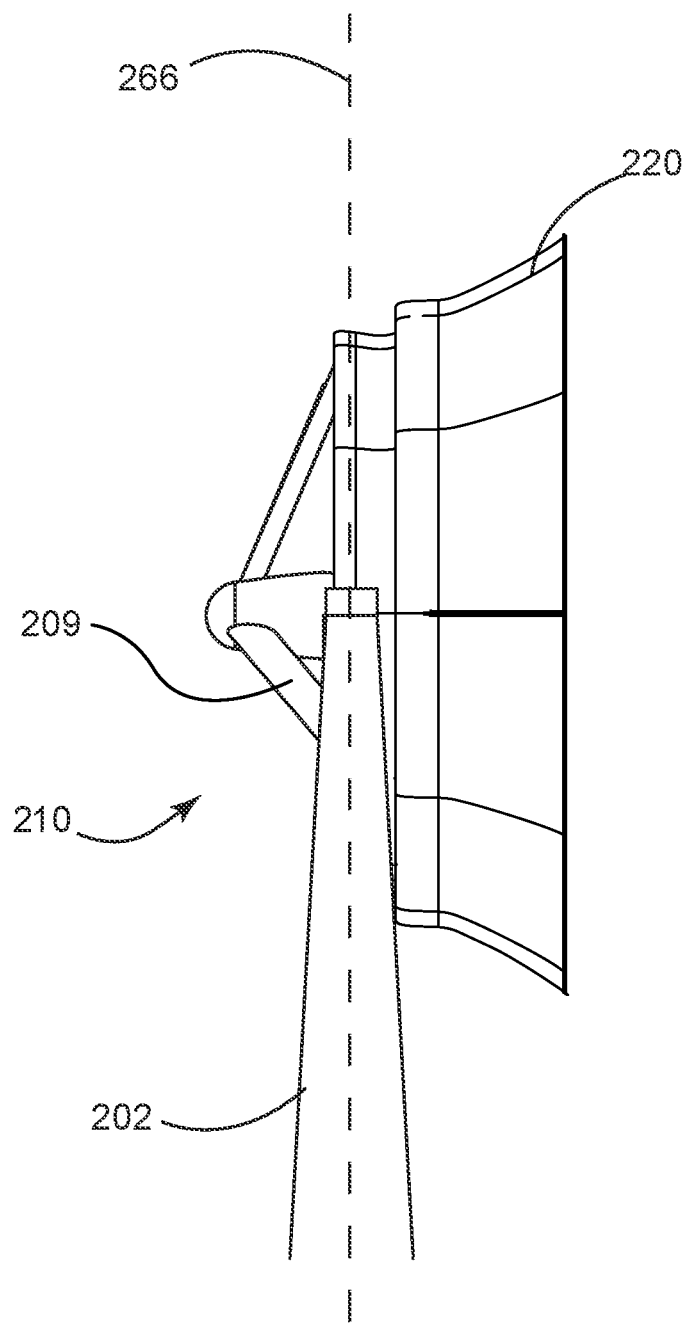
FIG. 6 is a side, orthographic view of the embodiment of FIG. 4.

FIG. 4, FIG. 5 and FIG. 6 show a turbine 200 with a ringed airfoil 210, ejector elements 220, and a tower 202 with yaw axis 264 that is offset from the central vertical axis 266 (FIG. 6). Like reference numbers refer to like components. A cantilevered support system is comprised of structural members 209 that are engaged at distal ends with the nacelle 250 (FIG. 4) and at the proximal ends with the tower 202.

Figure 7:
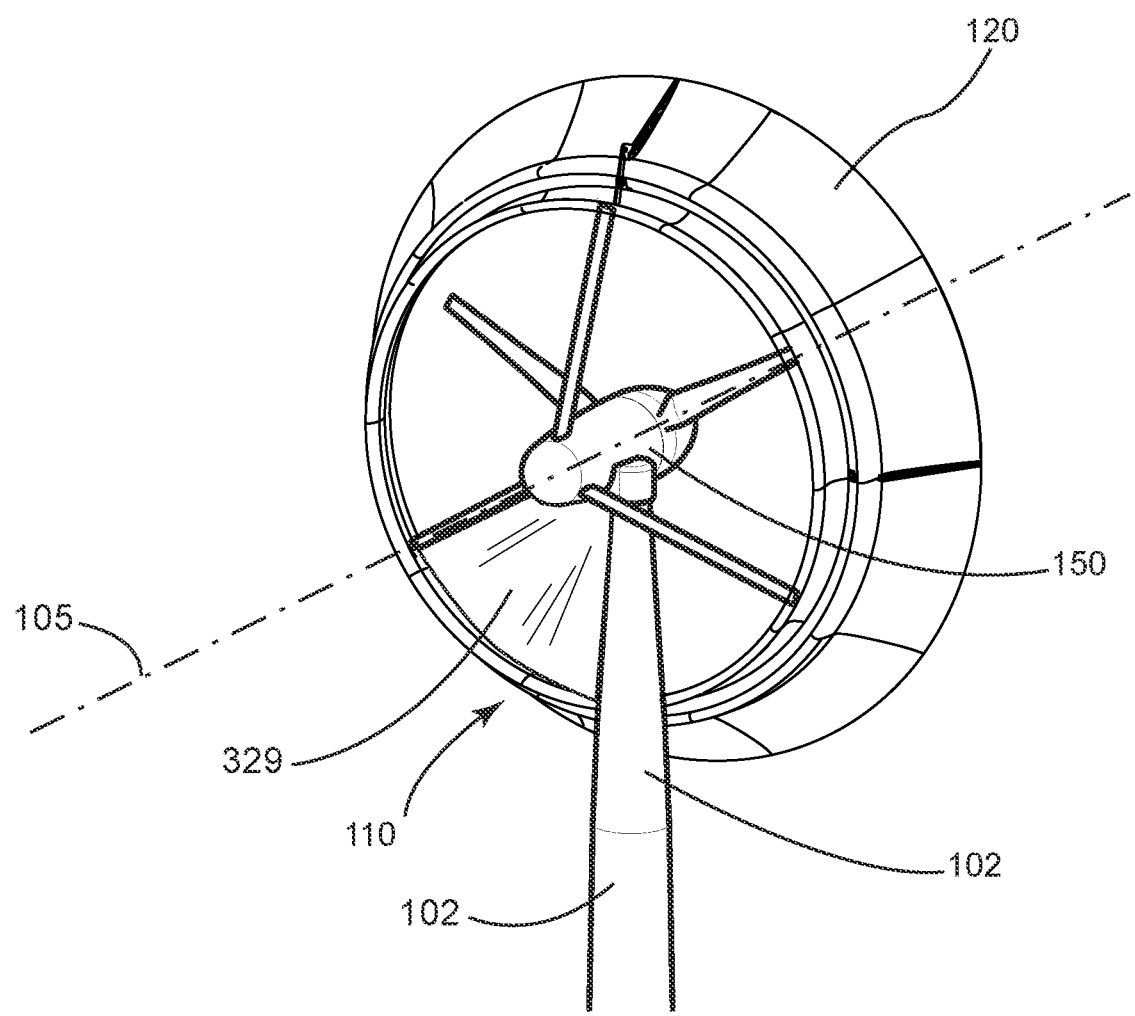
FIG. 7 is a front, right, perspective view of an example embodiment of the present disclosure.

FIG. 7 shows an embodiment 300 with a retractable surface 329, shown extended across a portion of the frontal opening of the turbine. This surface 329 creates increased drag on one side of the turbine, providing a unidirectional yaw that may rotate and assist in keeping the turbine yawed such that the central axis 305 is perpendicular to the fluid stream.

Figure 8:
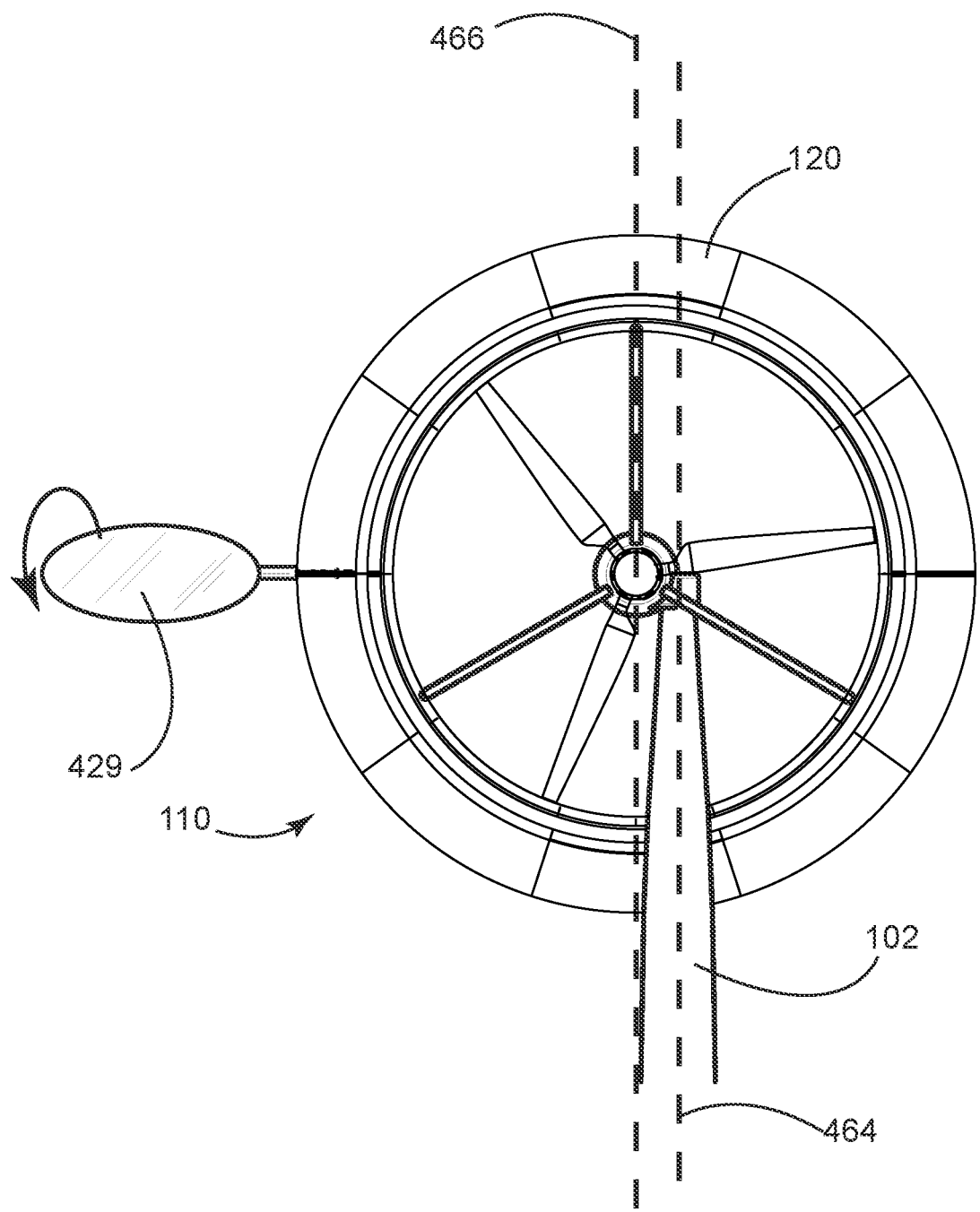
FIG. 8 is a front, orthographic view of an example embodiment of the present disclosure.

The embodiment of FIG. 8 illustrates a turbine with a yaw axis 464 that is offset from the central vertical axis 466, providing a passive-yaw assist 429. The passive-yaw assist is a planar form that may be rotated to a horizontal position, providing minimal drag, or rotated to a deployed configuration as shown, providing additional drag to one side of the yaw axis 464. Providing additional drag on one side of the yaw axis 464 increases the effect of the unidirectional passive yaw to effectively orient the turbine so that its central axis is perpendicular to the fluid stream.

Illustrations are not intended to limit the scope of the present disclosure.

The invention claimed is:

1. A fluid turbine comprising:
   a supporting tower; and
   only one rotor mechanically coupled with a generator; and
   a duct in fluid communication with said rotor and surrounding said rotor; and
   a rotor plane defined by said rotor swept area; and
   a horizontal axis extending from a center of said rotor plane, perpendicular to said rotor plane; and
   a central axis perpendicular to said horizontal axis and extending from said center of said rotor plane; and
   a center of pressure downwind of said central axis; and
   a yaw axis parallel to and offset from, said central axis, and located about the center of said supporting tower, providing an asymmetrical orientation of said yaw axis with respect to said only one rotor; wherein
   said center of pressure is configured to rotate about said yaw axis thus providing a force to yaw said fluid turbine to a position wherein said rotor plane is parallel to a wind direction.

2. The fluid turbine of claim 1 further comprising:

a mechanical yaw drive system for rotating said fluid turbine with respect to said wind direction; wherein in a failure of said mechanical yaw drive system, said fluid turbine rests in a position wherein said rotor plane is parallel to said wind direction.

3. The fluid turbine of claim 1 further comprising:

a surface stowably engaged and furled about said fluid turbine; and said surface configured to be unfurled about said duct asymmetrical with respect to said central axis and opposite said central axis with respect to said yaw axis; wherein said surface when unfurled provides wind resistance further providing a rotational force about said yaw axis.

* * * * *